United States Patent [19]

Isogai et al.

[11] 4,040,162
[45] Aug. 9, 1977

[54] METHOD OF PRODUCING COMPOSITE EXTRUDED ALUMINUM PRODUCTS FROM ALUMINUM SWARF

[75] Inventors: Mitsuyuki Isogai, Okazaki; Kouiti Tikusa, Nagoya; Yosihiko Nakamura, Anzo, all of Japan

[73] Assignee: Aisin Seiki Kabushiki Kaisha, Kariya, Japan

[21] Appl. No.: 619,168

[22] Filed: Oct. 3, 1975

Related U.S. Application Data

[62] Division of Ser. No. 506,809, Sept. 17, 1974, abandoned.

[30] Foreign Application Priority Data

Sept. 17, 1973   Japan ................................. 48-104737

[51] Int. Cl.² .............................................. B22F 3/24
[52] U.S. Cl. ..................................... 29/420.5; 72/258; 29/403
[58] Field of Search .............. 29/401, 402, 403, 420.5, 29/420; 72/258

[56] References Cited

U.S. PATENT DOCUMENTS

| 2,391,752 | 12/1945 | Stern .................................... 29/403 |
| 2,986,273 | 5/1961 | Bardgett .............................. 72/258 |
| 3,010,196 | 11/1961 | Smith et al. ....................... 29/420.5 |
| 3,140,108 | 7/1964 | Klein et al. ........................... 72/258 |
| 3,626,578 | 12/1971 | Price ................................... 29/403 |
| 3,629,929 | 12/1971 | Wessel ............................. 29/420.5 |
| 3,803,892 | 4/1974 | Yamaguchi et al. .................. 72/258 |

*Primary Examiner*—C.W. Lanham
*Assistant Examiner*—V. Rising
*Attorney, Agent, or Firm*—Sughrue, Rothwell, Mion, Zinn and Macpeak

[57] ABSTRACT

Particulate aluminum or aluminum alloy swarf or waste is compressed under heat and pressure to form a billet. After subjecting the billet to a subsequent heat treatment at a higher temperature the billets are capable of being extruded by conventional extrusion apparatus. A conventional preheated billet of cast aluminum or aluminum alloy can be placed in the extrusion apparatus between the die plate and the preheated billet of aluminum or aluminum alloy swarf so that upon extrusion through the die orifice the compressed swarf billet and the conventional billet will comprise the core and coating portions of the product respectively.

3 Claims, 11 Drawing Figures

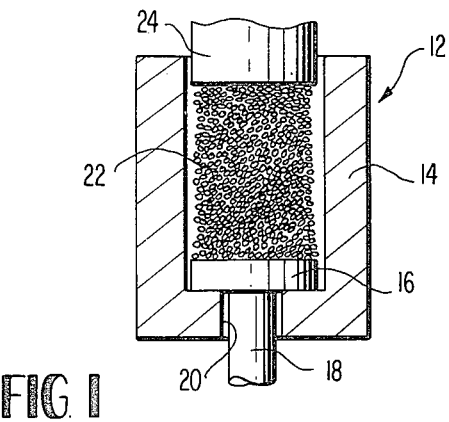
FIG. 1
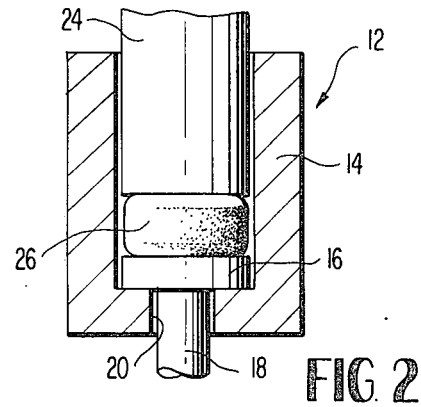
FIG. 2
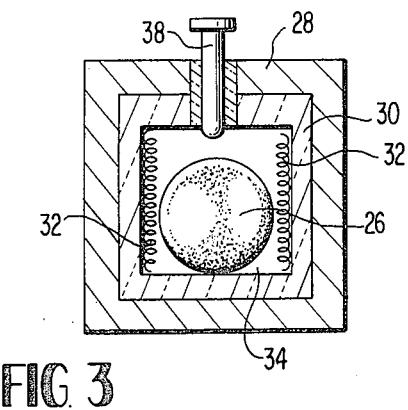
FIG. 3
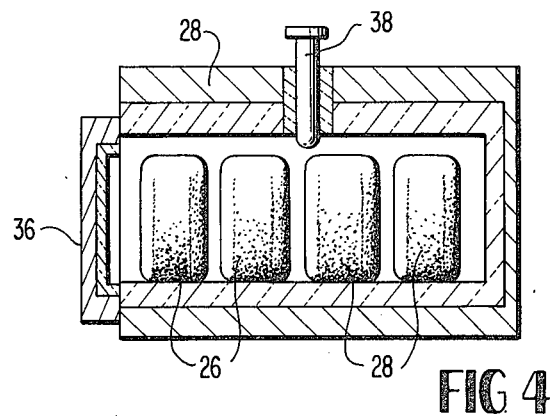
FIG. 4
FIG. 5
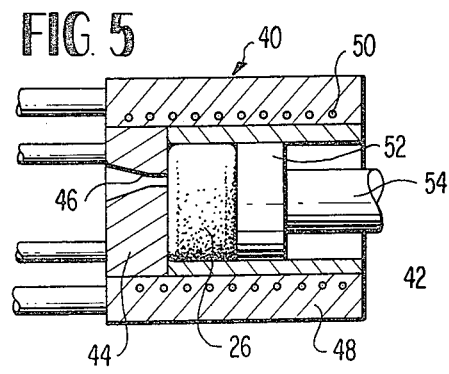
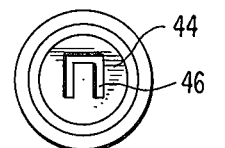
FIG. 6
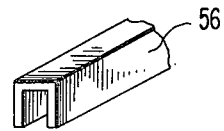
FIG. 7

METHOD OF PRODUCING COMPOSITE EXTRUDED ALUMINUM PRODUCTS FROM ALUMINUM SWARF

This is a division of application Ser. No. 506,809, filed Sept. 17, 1974, now abandoned.

BACKGROUND OF THE INVENTION

1. Field of the Invention

The present invention is directed to the reclamation of aluminum or aluminum alloy swarf and a method of treating the reclaimed swarf to enable the same to be extruded either alone or with a conventional billet of cast aluminum to provide a composite aluminum product.

2. Prior Art

In aluminum casting or machining workshops there is a considerable amount of particulate waste or swarf of aluminum or aluminum alloy which is produced as a result of cutting, grinding or boring operations. A dissolution method is available to reclaim this waste but such a method suffers from an extremely low rate of recovery due to the oxidation to which a major portion of the aluminum particles is subjected.

Several attempts have been made to compress such aluminum particles into billets within a metalic mold but such attempts are not satisfactory for producing products of consistent quality due to a considerable amount of foreign matter such as oxides and abrasive particles present in the waste as well as cutting oil and cutting materials which are extremely difficult to remove from the waste. Furthermore, prior art attempts to extrude such billets by forcing the billets under pressure through a die orifice to produce extruded products were generally unsatisfactory. Such extruded products frequently had reduced mechanical strength due to the presence of pores in the billets which resulted from a poor bond or insufficient fusion between the particles. The presence of such pores furthermore resulted in extremely poor finish on the extruded material.

Several prior art attempts have also been made to provide a composite extruded product having a core and a covering layer. One of these methods for producing such a composite product is a hot rolling pressure welding method. This method is advantageous in that it permits a continuous operation but the products are necessarily limited to a round-shaped and its equivalent. The other method is a hydrostatic extrusion method such as that disclosed in ASEA: Wire Ind, 38, 647 (Sept. 1971) N. Hornmark, D. Frmel: Draht-Welt 56, 424 (Aug. 1970). This method involves the production of copper clad aluminum products by hydrostatic extrusion wherein a composite billet comprising a preformed core of aluminum surrounded by a close fitting sheet of copper is subjected to hydrostatic pressure through a pressure medium in response to the travel of a ram. When the pressure reaches a predetermined value the composite billet is forced through a die orifice into a predetermined shape. Thus, no friction occurs between the billet and the container in which the billet is placed and furthermore a forced lubrication effect is provided by the pressure medium between the die and the billet resulting in an extremely low friction loss. Although this method only permits an intermittent operation as distinct from the aforementioned rolling method it is highly efficient in that a high degree of formability is available for a cold operation as compared to the conventional method and that elongated billets are usable. In other words, according to this hydrostatic extrusion process, there is no limitation as to the shape of the products. However, this hydrostatic extrusion process requires the use of hydrostatic extrusion equipment and also a coating material in the form of a tubing. The formation of such a composite billet wherein a preformed billet of pure aluminum is provided with a close fitting sheet of copper prior to extrusion is an extremely costly and troublesome operation.

SUMMARY OF THE INVENTION

The present invention provides an improved method of extruding billets of aluminum or aluminum swarf wherein the billets are preheated prior to extrusion to increase the tensile strength and improve the finish on the extruded product.

The present invention also provides an improved method of extruding composite products comprising a core of compressed aluminum swarf and an outer covering or sheet of conventional cast aluminum or corrosion resistent aluminum alloy wherein a compressed billet of aluminum or aluminum alloy swarf and a conventional billet of aluminum or aluminum alloy are preheated prior to being placed in contiguous relation in an extrusion apparatus with the conventional billet disposed intermediate the compressed billet and the die plate for simultaneous extrusion into a desired shape.

The foregoing and other objects, features and advantages of the invention will be apparent from the following more particular description of a preferred embodiment of the invention as illustrated in the accompanying drawings.

BRIEF DESCRIPTION OF THE DRAWINGS

FIG. 1 is a sectional view of the apparatus for forming billets from aluminum swarf prior to the compression of the swarf.

FIG. 2 is a sectional view similar to FIG. 1 showing the swarf compressed into a billet.

FIG. 3 is a cross-sectional view of the heating chamber for preheating the compressed swarf billets prior to extrusion.

FIG. 4 is a longitudinal sectional view of the chamber of FIG. 3.

FIG. 5 is a sectional schematic view of a heated extrusion apparatus for extruding a preheated billet of compressed swarf.

FIG. 6 is a plane view of the die plate, per se, of FIG. 5.

FIG. 7 is a perspective view of a product extruded through the die plate of FIG. 6.

DETAILED DESCRIPTION OF THE INVENTON

Figure 8:
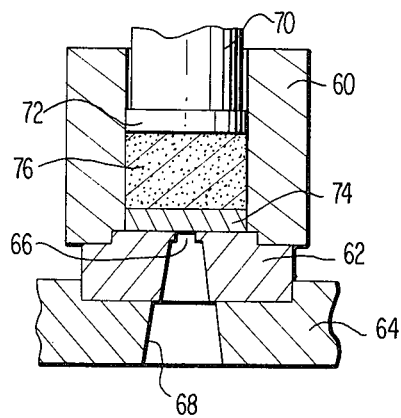
FIG. 8 is a cross-sectional schematic view of an extrusion apparatus showing a conventional billet of cast aluminum and a compressed billet of aluminum swarf in position for extrusion.

The billet forming apparatus 12 of FIG. 1 is comprised of a cylindrical molding chamber 14 having a knock out plunger 16 disposed in one end thereof. The plunger 16 is provided with an actuating rod 18 which extends through an aperture in the chamber 14 for connection to any suitable operating means. The particulate aluminum or aluminum alloy swarf 22 is loosely placed in the chamber 14 as shown in FIG. 1 for compression by a ram 24 slidably operable in the chamber 14. Upon movement of the ram 24 into the chamber the swarf is compressed into a billet 26 having a substantially cylindrical configuration as shown in FIG. 2.

A plurality of compressed billets 26 are then placed in a heating furnace 28 such as that shown in FIGS. 3 and 4. The furnace is lined with insulating material 30 such as bricks or the like and a plurality of heating elements shown schematically at 32 are disposed in the central rectilinear chamber 34 in which the compressed billets 26 are located. A door 36 is provided to close one end of the furnace 28 and a thermal couple 38 extends through the wall of the furnace 28 to the chamber 34 for sensing the temperature within the chamber.

The preheated billet 26 is then introduced into an extrusion apparatus 40 which is comprised of a cylindrical extrusion container 42 closed at one end by a die plate 44 having a suitable die orifice 46 extending therethrough. The extrusion container 42 and the die plate 44 are surrounded by a cylindrical housing 48 having electrical heating elements such as nichrone wires 50 embedded therein for the purpose of maintaining the extrusion apparatus at a predetermined temperature. A pressure plate 52 having an operating stem 54 connected thereto is slidably mounted within the extrusion container 42. The stem 54 may be connected to any suitable hydraulic operating means for the purpose of applying extrusion pressure to the billet 26. As shown in FIG. 6 the die orifice 46 has a channel-shaped configuration to produce the channel-shaped extrusion 56 of FIG. 7. However, it is obvious that the configuration of the die orifice could be varied without departing from the scope of the present invention.

In carrying out the method of the present invention, the chamber 14 which is made of iron and kept at room temperature is filled with the waste or swarf and the rim 24 is operated by a suitable hydraulic pressure means to apply a pressure of approximately 30 kg/mm² to the waste or swarf 22 within the container to produce a billet 26. The volume of the waste or swarf is reduced to approximately 1/20 the original loose volume. The billet 26 which is comprised of aluminum alloy depending upon the source of the waste or swarf is removed from the chamber 14 by the upward movement of the knock out plunger 16.

The billet 26 is then placed with other similar billets in the furnace 28 which is heated by the nichrome wires 32 so that the temperature of the billets may be kept between 350° C and 450° C for a predetermined period of time. The temperature control is effected by the operation of the thermal couple 38. Subsequently the heated billet is removed from the furnace 28 and introduced into the extrusion apparatus 40. The stem 54 is hydraulically operated to press the piston 52 to force the billet through the die orifice 46 whereby the product 56 of a preselected shape is produced. During the extrusion the extrusion container 42 and the die plate 44 are maintained at a temperature approximately equal to the preheated temperature of the billet by means of the heating elements 50.

Table 1 shows a relationship between the temperature within the heating furnace and the tensile strength of extruded products. As will be seen from Table 1, the tensile strength is relatively low when the furnace temperature is below 350° C. This is believed to result from the poor bond which takes place between the particles of aluminum or aluminum alloy. Thus, a larger hydrostatic pressure is necessary to operate the piston 52 and the entire extrusion apparatus 40 must be constructed in a more rigid manner. The tensile strength also shows a drastic decrease at temperatures above 400° C and it has been found that such high temperatures cause many flaws such as cracks to appear on the surface of the product. Therefore, by maintaining the temperature of the billets between 350° C and 450° C it is possible to use a lighter extrusion apparatus and produce a more perfect product.

Table 1

| billet heating temperature | 300° C | 350° C | 400° C | 450° C | 500° C |
|---|---|---|---|---|---|
| tensile strength | 23.2 kg/mm² | 26.8 | 28.1 | 27.5 | 15.2 |

Table 2 shows a comparison of two different prior art methods with the method according to the present invention. The dissolution method for forming a billet for extrusion suffers from an extremely low rate of reclamation because of the oxidation to which a major portion of the aluminum particles is subjected. The tensile strength and percent of elongation according to the present invention is substantially greater than either of the prior art methods.

Table 2

|  | Tensile Strength | Elongation |
|---|---|---|
| Dissolution Method | 24.8 kg/mm² | 1.6% |
| Extrusion Method (without heating) | 23.0 kg/mm² | 3.2% |
| Method of present invention (billets are heated to 400° C) | 28.1 kg/mm² | 6.8% |

Even using the foregoing methods for compressing the aluminum swarf into billets it was still found difficult to obtain products of consistent quality due to a considerable amount of foreign matter such as oxide, abrasive particles as well as cutting oil and coating materials which are extremely difficult to remove from the waste or swarf. In order to improve the quality of the billet it is important that the bulky waste or foreign matters present in the aluminum swarf such as plate or slab-like aluminum pieces, iron pieces, brick pieces and so forth be removed from the aluminum waste since they are likely to impede a satisfactory extrusion and since they will also effect the quality of the end products. It is preferable to clean the waste by the use of acid or alkali solutions in advance for the purpose of de-oiling the waste.

The compression of the aluminum waste is advantageously effected at cold temperatures or at moderate temperatures below 300° C. If the compression takes place above this temperature there is likely to occur a bond or fusion especially in the crust portion of the billet, which acts to prevent the escape of gases encapsulated in the billet which would otherwise lead to blisters on the surface of the billet during the subsequent heating process as well as deformation of the final product. The compression of the particulate waste or swarf should also be controlled since excessive compression of the waste could also cause bonding between the particles of the aluminum or aluminum alloy which would impede the escape of the gas enclosed within the billet. By controlling the compression force the compressed billet will retain an appropriate porosity. It is found that a compressed billet having a bulk specific gravity of 1.4-2.1 provides an extremely good result.

When a billet is placed directly on a die of an extrusion press as in the foregoing process the bearing areas of the die might be subjected to damage if oxides, hard particles resulting from tool wear or pro-eutectic silicon are all present in the aluminum waste. These impurities could also cause streaks on the surface of the final extruded products. This problem is solved by the present invention by employing a conventional billet of aluminum or aluminum alloy in addition to a compressed billet of aluminum waste for extrusion.

As in the aforementioned method of the present invention the compressed billet and the conventional billet are both heated to a temperature of 400°-500° C in a heating furnace. By heating the billets to this temperature it is possible to remove organic contaminates such as cutting oil and paints which might be present in the compressed billet and the billet will also be brought to a temperature which is appropriate for extrusion.

The extrusion apparatus as shown in FIG. 8 is somewhat similar to the extrusion apparatus shown in FIG. 5 and is comprised of a tubular extrusion container 60 and a die plate 62 which is supported by a die holder 64. The die plate 62 is provided with an extrusion orifice 66 and the die holder plate is provided with a larger orifice 68 which communicates with the extrusion orifice 66. A ram 70 is slidably mounted within the tubular extrusion container 60 and is disposed in contact with a slidably mounted pressure plate 72. Suitable lubricant means may be provided in conjunction with the pressure plate 72 and the entire assembly may be heated in the manner in which the extrusion apparatus of FIG. 5 is heated. The preheated conventional billet is placed in the tubular extrusion container 60 in contact with the die plate 62 and the preheated compressed billet 76 is placed between the conventional billet 74 and the pressure plate 72. For extrusion it is preferable to heat the die plate and extrusion container to a temperature equal to or somewhat lower than the temperature of the two billets.

Figure 9:
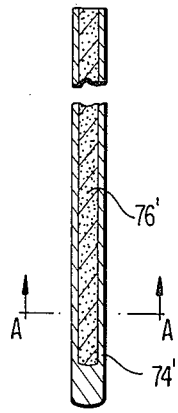
FIG. 9 is a longitudinal sectional view of a composite product as extruded by the apparatus of FIG. 8.
Figure 10:
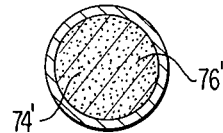
FIG. 10 is a cross-sectional view of the product of FIG. 9 taken along the line A—A.

During extrusion, as the ram 70 does the travel toward the die plate 62 the compressed waste billet 76 is further compressed to permit the escape of gases encapsulated in the pores of the billet through the surface pores thereof. The degasing is possible since the billet is precompressed in the aforementioned manner so as to have the proper degree of porosity. The gases enclosed in the pores of the billet result from the heating and decomposition of cutting oils. As a result of such compression the billet becomes more solid and compact. As the ram 70 travels further towards the die plate 62 the conventional billet placed on the die plate is forced out of the die through the extrusion orifice 66 and is followed by the compressed waste billet 76. The conventional billet 74 which is first forced through the die orifice 66 is kept in contact with the orifice bearing area during extrusion. In other words, the extrusion takes place in such a manner that the compressed waste billet 76 and the conventional billet 74 comprise the core 76' and coating portions 74' of the product, respectively, as shown in FIGS. 9 and 10. In this way, the bearing area of the die orifice 66 is at all times kept free from contact with oxides or other hard materials thus avoiding possible damage which would otherwise take place. Furthermore, by so doing, it is possible to achieve a smooth and efficient extrusion of the billets. The products thus obtain are free of any defects inside as well as on the surface thereof and are of consistently high quality.

As for the material used in the formation of the billet, aluminum waste can be employed in the practice of this invention and may comprise relatively small particles of aluminum or aluminum alloy such as those produced by cutting, grinding or boring operations. Other forms of aluminum particles such as aluminum foils can be used but it is preferable to remove large pieces of aluminum waste such as plate or slab-like aluminum since they are likely to effect the consistent quality of the resultant product. A variety of commercial aluminum or aluminum alloys can be employed for forming the conventional billet. Among these aluminum or aluminum alloys, expand these aluminum or aluminum alloys are especially preferable for providing a smooth extrusion. The method of the present invention permits the manufacture various types of products including solid and hollow products depending upon the particular extrusion orifice in the die plate.

The following examples are illustrated with the present method and by no means limiting insofar as the scope of the invention is concerned.

EXAMPLE 1

A billet of pure aluminum casting, SAE 212 or corrosion resistent aluminum alloy which is 50 grams by weight and having a diameter of 53 mm is heated to 450° C. Another billet of aluminum alloy SAE 332 is formed by cold pressing aluminum swarf or waste such as aluminum particles resulting from machine. The compressed billet is 500 grams by weight and has a diameter of 53 mm. Aluminum alloys employed in this example include both of silicon, copper, magnesium, etc. The extrusion container is heated to 400° C and the two billets are preheated to 450° C before being placed in the extrusion container with the billet of pure aluminum or corrosion resistent aluminum alloy disposed adjacent the die plate and the compressed billet disposed adjacent the lubricated pressure plate. The ram is moved downwardly to force the billet through the extrusion orifice in the die plate of FIG. 8 to produce a cylindrical rod having a covering as shown in FIGS. 9 and 10. As best shown in FIG. 8 the product thus extruded is comprised as tip only of the pure aluminum or aluminum alloy from the conventional billet and the remaining portion of the product comprises an aluminum clad rod having a core formed from the compressed swarf billet.

EXAMPLE 2

SAE 212 aluminum alloy particles produced by cutting operation in the aluminum workshop washed by the use of a dilute NAOH solution or de-oiling purposes and, placed in a molding container of a compression molding press for subsequent compression into a billet. The molding container had an inside length of 660 mm and a diameter of 100 mm. A compressive force of approximately 35 kg/mm² was applied. The billet thus formed has a bulk specific gravity of 1.9 and was 100 mm in diameter and 320 mm in height.

A conventional billet having a diameter of 100 mm at a height of 30 mm was formed from molten SAE 212 aluminum alloy by die casting. Both billets were heated to 500° C within an electric furnace and were placed in an extrusion container which have been heated to 450° C in such a manner that the compressed billets were situated on the ram side of the container and the conventional billet was situated on the die side thereof. Thereafter the billets were extruded through a die orifice and a fine finish round rod having a diameter of 15 mm covered with a SAE 212 aluminum alloy coating was obtained. Inspection made after extrusion revealed that there was no damage caused in the bearing area of the die. The round rod thus produced is subjected to a conventional treatment called $T_5$ at 180° C for 4 hours. Then it was measured in terms of mechanical strength. The result was a tensile strength of 24 kg/mm$^2$ which is equivalent to mechanical strength of conventional $T_5$ aluminum alloy. The heat treatment caused no defects such as warp or blisters.

EXAMPLE 3

Similar to Example 2 waste or swarf of SAE 332 aluminum alloy casting produced as a result of a cutting operation in an aluminum casting workshop was compressed in a container to form a cylindrical compressed billet having a diameter of 100 mm and a height of 260 mm with a bulk specific gravity of 2.0. The compressed billet thus formed together with a conventional billet of SAE 212 aluminum alloy having a diameter of 30 mm and a height of 100 mm was heated and compressed in an extrusion container in the same manner as the Example 2 for extrusion. The resulting product was a round rod comprising an SAE 332 alloy core cover with a SA 212 alloy coating. This rod has a fine finish surface and a tensile strength of 32 kg/mm$^2$.

EXAMPLE 4.

A compressed billet of SAE 212 aluminum alloy swarf similar to that employed in the Example 2 and a conventional billet of SAE 205 aluminum alloy having a diameter of 100 mm and a height of 15 mm were heated to 450° C within an electric furnace and placed in an extrusion container and then extruded through a port hole die. The resulting product was a hollow cylinder having a fine finish which was 15 mm in diameter and 5 mm in thickness.

Figure 11:
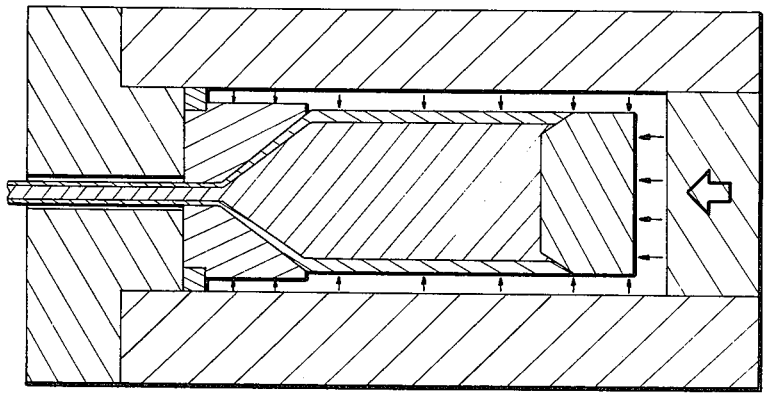
FIG. 11 is a longitudinal sectional view of a prior art hydrostatic extrusion apparatus.

As has been described above the present invention provides a novel method of extrusion which permits the manufacture of products of various shapes depending upon the shape of the die orifice, which method does not require the use of a hydrostatic extrusion press such as that shown in FIG. 11 and which does not require the use of a tubular material as a covering material for the billet prior to extrusion as shown in FIG. 11. According to the present invention a conventional extrusion press can be utilized and a solid billet of aluminum or aluminum alloy and a compressed billet of aluminum swarf can be used as is. According to the present invention instead of preforming a composite billet prior to extrusion two different billets are placed in the container in superimposed relation and then forced to the die orifice. Since the aluminum waste or swarf can be utilized as a core material the present invention offers a substantially reduce production cost over the prior art methods.

While the invention has been particularly shown and described with reference to preferred embodiment thereof it will be understood by those in the art that various of changes in form and details may be made therein without departing from the spirit and scope of the invention.

What is claimed is:

1. A method of extruding composite products having a core and an external sheath comprising heating a die plate, pressure plate and an extrusion container at a constant temperature, compressing aluminum swarf into a billet having a bulk specific gravity of 1.4 to 2.1 preheating a billet of cast aluminum and said billet of compressed aluminum swarf to a temperature higher than the temperature of said die plate, pressure plate and extrusion container, placing said billet of cast aluminum in said container adjacent said die plate and placing said billet of compressed aluminum swarf between said billet of cast aluminum and said pressure plate, and forcing said billets through an extrusion orifice in said die plate to form an elongated extrusion having a core of said aluminum swarf and a covering of said cast aluminum.

2. A method as set forth in claim 1 wherein said die plate and extrusion container are heated to 400° C and said billets are preheated to 450° C.

3. A method as set forth in claim 1 wherein said billets are preheated to a temperature of 400° C to 550° C.

* * * * *